(No Model.)
G. W. DAVIS.
THILL COUPLING.
No. 539,858.  Patented May 28, 1895.
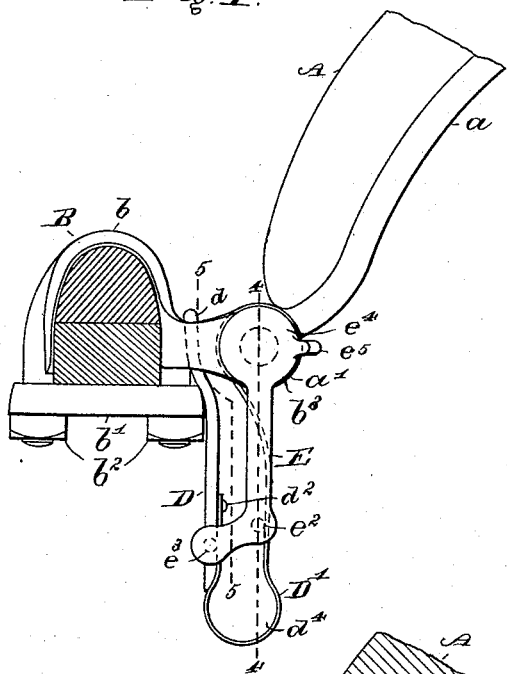
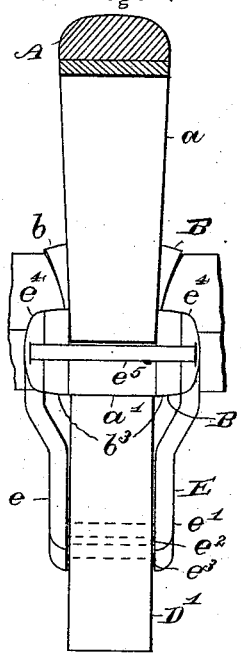
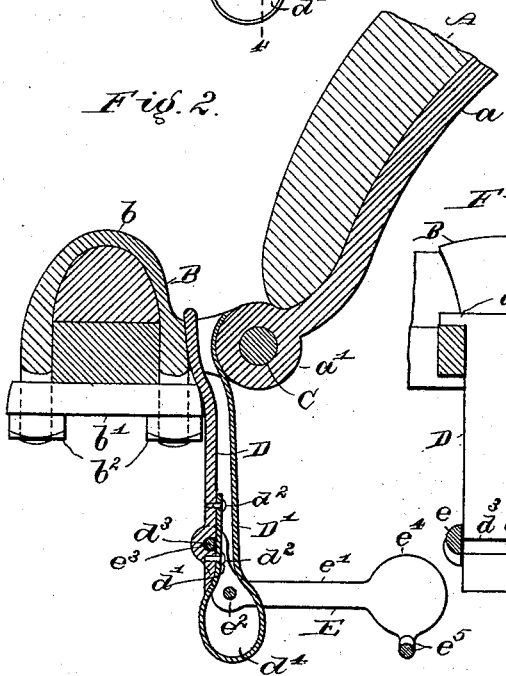
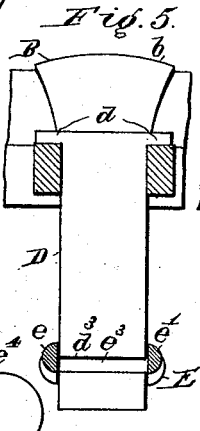
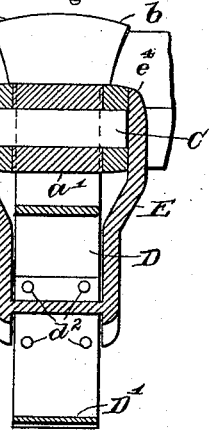
WITNESSES.
Kirkley Hyde.
Agnes Bailey.
INVENTOR
George W. Davis,
By Albert M. Moore,
His ATTORNEY.

UNITED STATES PATENT OFFICE.

GEORGE W. DAVIS, OF GILSUM, NEW HAMPSHIRE, ASSIGNOR OF ONE-HALF TO EDDO V. BATES, OF DRACUT, MASSACHUSETTS.

THILL-COUPLING.

SPECIFICATION forming part of Letters Patent No. 539,858, dated May 28, 1895.

Application filed July 14, 1894. Serial No. 517,546. (No model.)

*To all whom it may concern:*

Be it known that I, GEORGE W. DAVIS, a citizen of the United States, residing at Gilsum, in the county of Cheshire and State of New Hampshire, have invented a certain new and useful Improvement in Thill-Couplings, of which the following is a specification.

My invention relates to thill couplings and consists in the devices and combinations hereinafter described and claimed and having for their object, to prevent the rattling of the shaft-eye, axle-clip and bolt of the thill-coupling, and to enable the coupling-parts to be easily and quickly separated from each other without the use of tools, in order to substitute a pole or shaft for thills or the reverse.

In the accompanying drawings, Figures 1 and 2 are side elevations of part of a thill, a thill-coupling provided with my improvement, and a vertical section of the axletree to which the thill is coupled, the bolt-retaining and spring-pressing lever being in working position in Fig. 1 and in position to permit of the bolt being drawn in Fig. 2; Fig. 3, a front elevation of the parts shown in Fig. 1; Fig. 4, a vertical transverse section on the line 4 4 in Fig. 1; Fig. 5, a vertical transverse section, on the line 5 5 in Fig. 1, of the axle-clip, omitting the hanger and spring.

The shaft or thill A, thill-iron or shaft-iron $a$, secured to said shaft and terminating at its rear end in a transversely hollow cylinder or shaft-eye $a'$, the axle-clip B, consisting of the bow $b$, tie $b'$, through holes in which the reduced ends of said bow are passed, nuts $b^2$, screwed on the ends of said bow below said tie and a fork $b^3$, between the laterally perforated tines of which the shaft-eye $a'$ is held, are all of the usual construction and operation, except as hereinafter stated.

Instead of the usual coupling bolt and nut which secure the shaft-iron in the fork $b^3$ of the axle-clip, I use a bolt or pin C which passes entirely through said fork and through the shaft-eye $a'$, but is loose in said fork and shaft-eye. A rigid hanger D, consisting of a plate of metal, is wide enough to fit closely between the tines of the fork, and is provided at its upper end with ears $d$, which rest upon the top of said fork and prevent said hanger from falling down through the fork. The hanger D extends below the fork for a considerable distance and has secured to, or formed in one piece with its lower end a leaf-spring $D'$, which extends downward and then loosely up through the fork in front of said hanger and back of the shaft-eye $a'$, the upper free end of said spring $D'$ being curved at $d'$ to fit the back of said shaft-eye. The spring is represented as formed in a separate piece from the hanger, and as secured thereto by rivets $d^2$. The shape and position of said spring are such that it does not of its own elasticity, press with any considerable force upon the rear of the shaft-eye.

The front face of the hanger D, is provided with a horizontal transverse groove $d^3$ and a bent pressure-lever E, has its fulcrum in said groove $d^3$, said lever consisting of two equal bars $e$ $e'$ connected by two parallel horizontal cross-bars $e^2$ $e^3$, the lower $e^3$ of said cross-bars turning in said groove and being retained therein by the portion of the spring $D'$ which is secured to said hanger. The cross-bar $e^2$ passes through the loop $d^4$ of the spring, so that when the free end of the lever E, is turned downward into the position shown in Fig. 2, said cross-bar $e^2$ is out of contact with said spring, but when said lever is turned upward into the position shown in Fig. 1, said cross-bar $e^2$ crowds the front part of the spring forward and causes the upper end of the spring to press the shaft-eye $a'$ forward with great force against the bolt C and prevents any rattling of said shaft-eye and bolt.

When the lever E is in the position shown in Fig. 2, the bolt C may be pushed out of the fork and shaft-eye by the finger or by a stick or nail, but when said lever is in the position shown in Fig. 1, the free ends $e^4$ of the lever cover the ends of said bolt and prevent its withdrawal.

When the lever is in the position shown in Fig. 1, it will be seen that the bar $e^2$ is above the fulcrum-bar $e^3$ and the pressure of the spring prevents said lever from falling down and tends to throw the upper ends of said lever backward.

The backward movement of the upper end of the lever is limited by a stop $e^5$ which strikes against the front of the fork and preferably connects the bars $e$ $e'$ of said lever as shown in Fig. 3. The stop-bar $e^5$ is represented as projecting forward from the sides of the lever E in Fig. 1, to enable said lever to be grasped thereby and turned downward.

For appearance sake, the free ends $e^4$ of the lever may be disks of the same diameter as the rounded sides of the fork, and preferably are convex on their side surfaces, as shown in Fig. 3, the only mechanical requirement being, of course, that said ends $e^4$ should cover the ends of the bolt C, when the lever is in the position shown in Fig. 1.

The device above described may be applied to thill-couplings already in use without altering them, prevents the rattling of the coupling-parts and enables the thills to be removed and applied without any thill coupling-jack or other tools, the pressure of the spring being no obstacle when the lever is turned downward.

I claim as my invention—

1. The combination of an axle-clip, provided with a fork having holes, a shaft-iron, having an eye, a bolt, arranged in said holes and eye and removable therefrom, a spring, arranged in said fork back of said shaft-eye and a lever, to press said spring against said shaft-eye, and thereby to create a tension in said spring, said lever being adapted to be turned to relieve the tension of said spring, as and for the purpose specified.

2. The combination of an axle-clip, provided with a fork having holes, a shaft-iron, having an eye, a bolt, arranged to pass loosely through said holes and eye, a hanger supported in said fork, a spring, arranged in said fork back of said eye and supported by said hanger, and a lever, turning on said hanger against or away from said spring to impart a tension to said spring or to relieve such tension and having free ends adapted to cover said holes and the ends of said bolt, when said spring is under tension and to leave the same uncovered when said spring is not under tension, as and for the purpose specified.

3. The combination of an axle-clip, provided with a fork having holes, a shaft-iron, having an eye, a bolt, arranged to pass loosely through said holes and eye, a hanger, adapted to be inserted between the tines of said fork and having ears to rest upon said tines, a spring, arranged in said fork back of said eye and supported by said hanger, and a lever, turning on said hanger against or away from said spring, to impart a tension to said spring or to relieve such tension, and having free ends, adapted to cover said holes and the ends of said bolt when said spring is under tension and to leave the same uncovered when said spring is not under tension, as and for the purpose specified.

In witness whereof I have signed this specification, in the presence of two attesting witnesses, this 2d day of July, A. D. 1894.

GEORGE W. DAVIS.

Witnesses:
FRANCIS C. MINOR,
JOSEPH M. BUNDY.